UNITED STATES PATENT OFFICE.

JOSEPH ZOTIQUE LA JOIE, OF TERREBONNE, CANADA.

COMPOSITION FOR BEVERAGES.

SPECIFICATION forming part of Letters Patent No. 685,853, dated November 5, 1901.

Application filed April 24, 1901. Serial No. 57,259. (No specimens.)

*To all whom it may concern:*

Be it known that I, JOSEPH ZOTIQUE LA JOIE, a subject of His Majesty the King of Great Britain, residing at Terrebonne, county of Terrebonne, Province of Quebec, Canada, have invented certain new and useful Improvements in Compositions for Beverages; and I do hereby declare that the following is a full, clear, and exact description of the invention, such as will enable others skilled in the art to which it appertains to make and use the same.

My invention is a composition for a non-alcoholic beverage or drink intended as a substitute for coffee, tea, cocoa, and other well-known substances.

It is my purpose to produce a composition involving a blend of the leaves from evergreen trees, which, under proper treatment, can be utilized to produce by simple means a healthful non-alcoholic drink.

By experiment it has been found that the use singly of one kind of evergreen leaves produces a strong unpalatable beverage, owing to an excess of resinous matters therein. Other kinds of evergreen leaves are not suitable when used singly, and when the different kinds are used in combination there must be a judicious selection of the varieties and of the proportions in which they are used.

My invention consists of the leaves of the following evergreens in substantially the proportions to be specified, to wit: white pine, one-half pound; white spruce, one pound; white fir, two pounds; red fir, one-half pound; red spruce, one-half pound. I desire to state, however, that the leaves of the black-spruce evergreen may be substituted for the red-spruce leaves, if desired.

The fresh green leaves of the different varieties of evergreens are carefully selected in different masses, each variety being cleaned, so as to exclude the branches, twigs, dead leaves, and other refuse. The different varieties are now weighed out in the proportions specified, and the mixture is now treated to make it keep for an indefinite time, if sealed in packages or bottles. I now proceed to expose the leaves to the action of steam, which serves to liberate the excess of gummy substance from the leaves of that variety—as, for example, the white pine—which is rich in resinous matters, and the leaves are now dried in an oven or exposed to the sun. This treatment makes the leaves assume a condition which preserves them for an indefinite time. The described treatment in connection with the judicious selection of the variety of leaves and the combining of them together in about the proportions specified produces a composition or mixture which may be boiled in water, so as to secure a healthful, aromatic, and non-alcoholic beverage.

The leaves may be packed in the whole or unground condition or they may be mechanically reduced by a grinding operation to a powdered condition. In using the composition two teaspoonfuls of the blended leaves, in a whole or in the powdered state, to a pint of boiling water will be found to give a palatable and aromatic beverage which can be produced and sold at a very low cost.

I claim—

The composition of matter for a beverage as a substitute for tea, coffee, and cocoa, consisting of a blend of the leaves of evergreens as follows: white pine, white spruce, white fir, red fir, and red spruce, in substantially the proportions specified.

In witness whereof I have hereunto set my hand in the presence of two witnesses.

JOSEPH ZOTIQUE LA JOIE.

Witnesses:
 H. F. BERNHARD,
 JOHN F. DEUFFERWIEL.